United States Patent [19]

Sakuragi et al.

[11] 4,443,684

[45] Apr. 17, 1984

[54] $CO_2$ LASER MACHINING APPARATUS

[75] Inventors: Shiro Sakuragi; Kyoshiro Imagawa; Haruo Kotani; Mitsunori Saito; Tomoyuki Haga, all of Kyoto, Japan

[73] Assignee: Horiba, Ltd., Kyoto, Japan

[21] Appl. No.: 335,661

[22] Filed: Dec. 30, 1981

[30] Foreign Application Priority Data

Jan. 27, 1981 [JP] Japan .................................. 56-11069

[51] Int. Cl.$^3$ .............................................. B23K 27/00
[52] U.S. Cl. ...................... 219/121 LH; 219/121 LB; 219/121 LV; 219/121 LX; 219/121 LY
[58] Field of Search .................. 219/121 LH, 121 LJ, 219/121 LP, 121 LZ, 121 FS, 121 LA, 121 LB, 121 LU, 121 LW, 121 LY, 121 LM, 121 L, 121 LV

[56] References Cited

U.S. PATENT DOCUMENTS

| | | | |
|---|---|---|---|
| 3,154,371 | 10/1964 | Johnson | 219/121 LA X |
| 3,621,198 | 11/1971 | Herbich | |
| 3,821,510 | 6/1974 | Muncheryan | 219/121 LV |
| 3,893,129 | 7/1975 | Endo et al. | 219/121 LB X |
| 4,190,759 | 2/1980 | Hongo et al. | 219/121 LA X |
| 4,316,467 | 2/1982 | Muckerheidie | 219/121 LB X |
| 4,338,508 | 7/1982 | Jones et al. | 219/121 LB X |

FOREIGN PATENT DOCUMENTS

| | | | |
|---|---|---|---|
| 2145921 | 3/1973 | Fed. Rep. of Germany | 219/121 LV |
| 2101325 | 3/1974 | Fed. Rep. of Germany | |
| 2321137 | 1/1979 | Fed. Rep. of Germany | |
| 2415513 | 9/1979 | France | 219/121 LY |

OTHER PUBLICATIONS

K. Jain, *IBM Technical Disclosure Bulletin*", "Controlled Laser Annealing by Raman Frequency Feedback", vol. 24, No. 8, pp. 4026–4027, Jan. 1982.

E. G. Lean, *IBM Technical Disclosure Bulletin*", "GaAs Laser Array and Fiber-Optic Detector Array for Disc Application", vol. 23, No. 7A, pp. 2992–2993, Dec. 1980.

*Primary Examiner*—C. L. Albritton
*Attorney, Agent, or Firm*—Wenderoth, Lind & Ponack

[57] ABSTRACT

A $CO_2$ laser machining apparatus, has a $CO_2$ laser oscillator connected with a condenser through a flexible cable including a fiber bundle for transmitting infrared rays of 10.6 micrometers therein.

11 Claims, 5 Drawing Figures

CO₂ LASER MACHINING APPARATUS

BACKGROUND OF THE INVENTION (1) Field of the Invention

The present invention relates to a $CO_2$ laser machining apparatus.

(2) Description of the Prior Art

In general, $CO_2$ laser beams are more useful than YAG (Yttrium-Antimony-Garnet) laser beams for machining processes such as printing (engraving), heat treatment, welding, cutting, drilling and the like because the former can attain an oscillation efficiency higher than the latter. As a result various machining apparatus, in which a $CO_2$ laser oscillator is used as a light source, have been proposed and it has been intended to use them practically.

However, all of the known $CO_2$ laser machining apparatus contain an optical system comprising a mirror and require a holder of said mirror, an arm supporting said holder and the like. As a result the construction of said optical system has been complicated and it has been unavoidable that the whole apparatus is large-sized.

For example, the machining apparatus is of such a type that said optical system is fixedly mounted and the stand for the objects to be machined is movable. The disadvantage is that a driving device of said stand is large-sized and thus the whole machining apparatus is a large-scale one.

On the other hand, where the machining apparatus of such a type is that the objects to be machined are fixedly mounted on the stand and laser beams travel toward said objects to be machined by rotating said mirror there is the disadvantage that said optical system is more complicated in structure, it being difficult to keep a high accuracy of said optical system. The irradiation angles of laser beams to said objects to be machined are varied with the transfer of said laser beams and consequently said objects to be machined are able to be vertically machined directly under a condenser while said objects to be machined are machined aslant at other positions, that is to say the states of machining are varied in dependence upon the positions of said objects to be machined.

SUMMARY OF THE INVENTION

As clearly understood from the above described actual conditions, it is an object of the present invention to provide a simple in structure and compact $CO_2$ laser machining apparatus by which highly accurate machining can be easily performed.

A $CO_2$ laser machining apparatus of the present invention comprises a $CO_2$ laser oscillator for oscillating $CO_2$ laser beams, a condenser; which is connected with said $CO_2$ laser oscillator through a flexible cable including fibers for transmitting infrared rays of 10.6 micrometers, for condensing said $CO_2$ laser beams irradiated from said $CO_2$ laser oscillator onto a focus; a stand for placing objects to be machined; a driving means for transferring said condenser on said stand; and a control means for controlling said $CO_2$ laser oscillator and said driving means.

A $CO_2$ laser machining apparatus of the above described construction has the advantages that its oscillation efficiency is improved, the objects to be machined are effectively machined, its optical system is remarkably simplified in structure, a small-sized and inexpensive apparatus is available, its optical system easily keeps its high accuracy for a long term, and the machining accuracy is improved because a $CO_2$ laser transmitter is used as a source of infrared rays and said optical system consists of fibers for transmitting infrared rays.

BRIEF DESCRIPTION OF THE DRAWINGS

The present invention will further be described, by way of example, with reference to the accompanying drawings, in which.

DETAILED DESCRIPTION OF THE PREFERRED EMBODIMENTS

Figure 1:
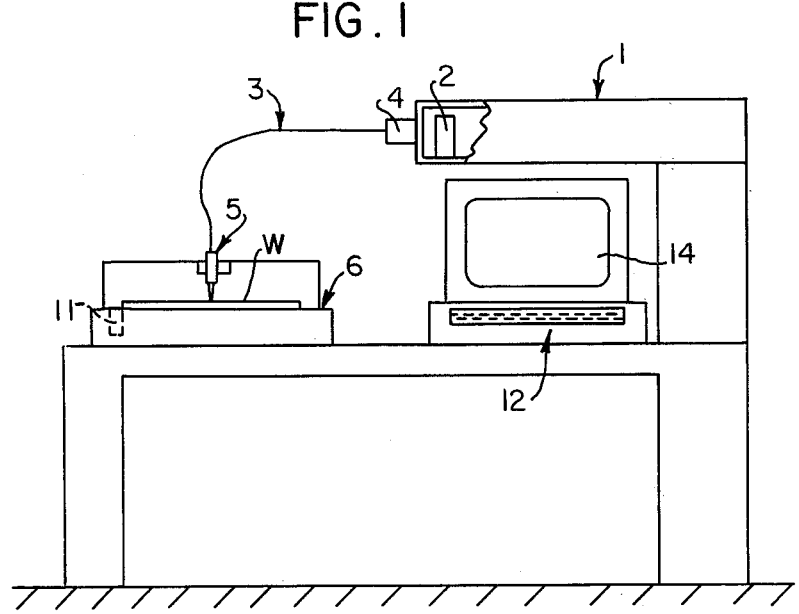
FIG. 1 is a full front view showing an example of a $CO_2$ laser machining apparatus according to the present invention.
Figure 2:
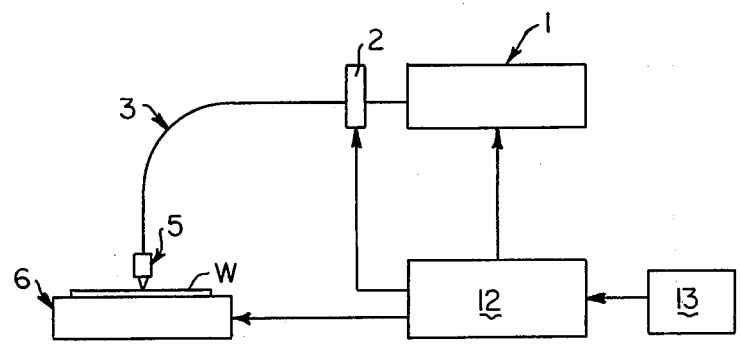
FIG. 2 is a block diagram of a $CO_2$ laser machining apparatus shown in FIG. 1.
Figure 3:
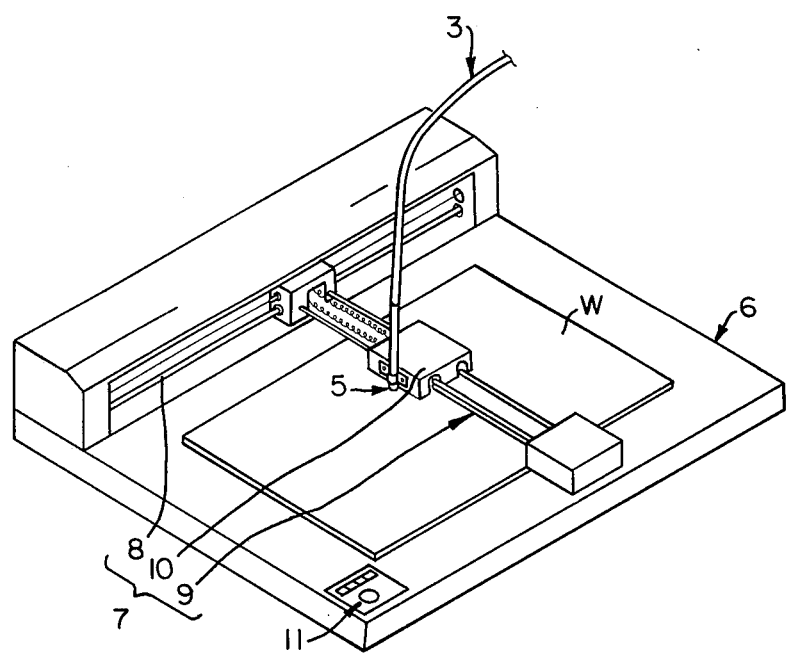
FIG. 3 is an enlarged perspective view showing a driving means of a condenser used in a $CO_2$ laser machining apparatus shown in FIG. 1, FIGS. 4 and 5 show another example of a $CO_2$ laser machining apparatus according to the present invention, in particular.

Referring now to FIGS. 1 to 3 showing an example of a $CO_2$ laser machining apparatus according to the present invention, a $CO_2$ laser oscillator 1 includes a shutter 2 therein and oscillates $CO_2$ laser beams. A flexible cable 3 is connected with said oscillator 1 through a portion for transmitting laser beams 4, including fibers for transmitting infrared rays of 10.6 micrometers therein. The flexible cable 3 is provided with a condenser 5 at the pointed end thereof. A stand 6 is provided with a driving means 7 for transferring said condenser 5 in two dimensions on said stand 6. The stand 6 fixedly holds the objects W to be machined, such as plate materials and the like. Said driving means 7 is provided with the first member 9 arranged perpendicularly to a rail 8. The first member 9 may be transferred linearly along said rail 8 and the second member 10 may be transferred longitudinally along said first member 9, said second member 10 being provided with said condenser 5. A XY-plotter on the market is preferably available as said stand 6 and said driving means 7. A power-meter 11 is mounted on the upper surface of said stand 6 at the appropriate position thereof and detects an output of laser beams, for example a thermopile type detector, a pyroelectric type detector, or the like. A control means 12 controls said $CO_2$ laser oscillator 1 and said driving means 7 on the basis of the data input from an input means 13 such as a key board and the like. For example, a microcomputer is used as said control means 12. A display means 14 indicates said input data of said control means 12.

The operation, in which said objects W to be machined are imprinted by means of a $CO_2$ laser machining apparatus of the above described construction, will be described below.

At first, said $CO_2$ laser oscillator 1 is activated and said condenser 5 is arranged so as to be in a position just above said power-meter 11. Laser beams of 10.6, generated in said oscillator 1, are transferred to said condenser 5 through said fibers for transmitting infrared rays contained in said flexible cable 3 and then are applied by said power-meter 11. Thus, it can be confirmed from an output signal of said power-meter 11 whether an output of said oscillator 1 has such a level that is suitable for printing or not. Also, an output can be adjusted if necessary.

And then, if the energy-level of laser beams is suitable, said objects W are machined under the condition that said condenser 5 is positioned just above said objects W. Said shutter 2, included in said $CO_2$ laser oscillator 1, is opened or closed on the basis of control signals (in case of using said XY-plotter, pen-up and down signals can be used as they are) given from said control means 12 on the basis of input data of a pattern to be printed while said condenser 5 travels over the surface of said objects W by means of said first member 9 and said second member 10 of said driving means 7. The pattern is printed on the surface of said objects machined W with an intermittent irradiation of laser beams on the surface of said objects W and the transference of said laser beams by the condenser 5 occurs on the surface of said objects W because the surface portion of said objects W is burnt out or thermally transformed by irradiating said laser beams thereto.

Figure 4:
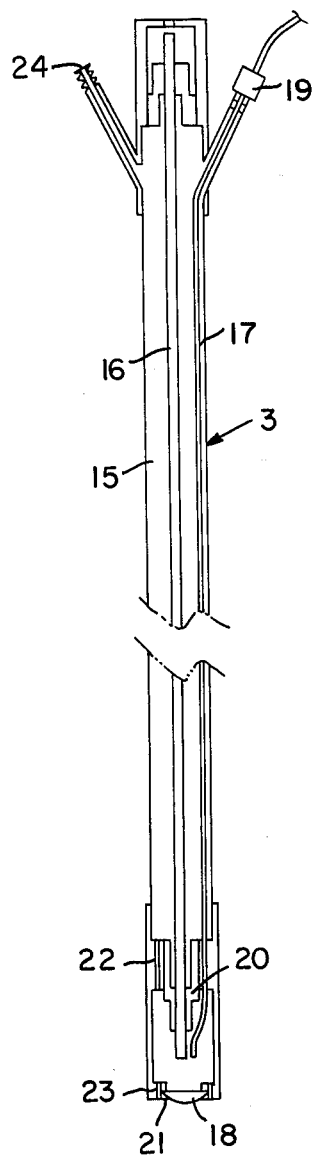
FIG. 4 is a longitudinal cross section of a cable.
Figure 5:
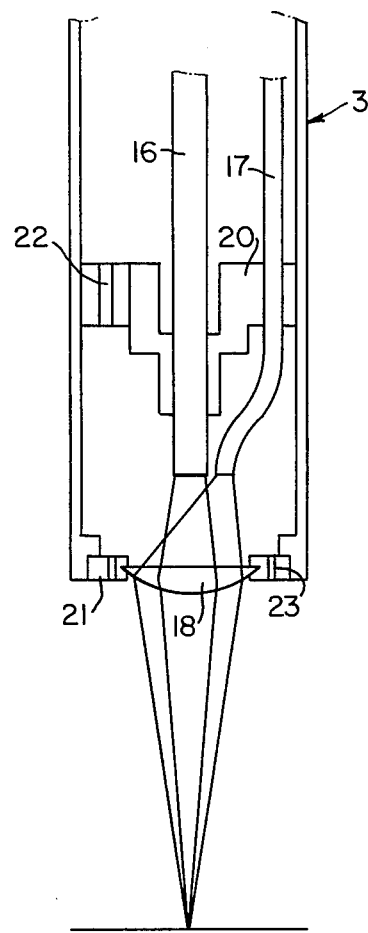
FIG. 5 is an enlarged longitudinal cross section showing the pointed end portion of said cable shown in FIG. 4.

FIGS. 4, 5 show another example of a $CO_2$ laser machining apparatus according to the present invention, characterized in that a flexible cable 3 is provided with a gas pipe 15 for simultaneously cooling and smoke-eliminating. Fibers 16 transmit said infrared rays of 10.6 micrometers and fibers 17 transmit infrared rays used for measuring temperatures of said objects to be W at the position to be machined. Fibers 16 and 17 (quartz, KRS-5, KRS-6, CsI and the like) are included in said flexible cable 3.

If an optical system between said $CO_2$ laser oscillator 1 and said condenser 5 is constructed from only said fibers 16 for transmitting infrared rays, it is feared that said fibers 16 for transmitting infrared rays would generate heat to deteriorate the flexible cable 3 in a short term with an increase of an output of said laser beams. Also, it is feared that, if a lens 18 of said condenser 5 is contaminated by a smoke generated by combustion of the surface portion of said objects W, the transmittance of laser beams would be reduced and said lens 18 would be broken owing to an absorption of laser beams.

According to this example, said flexible cable 3 is provided with said gas pipe 15 in order to cool said fibers 16 for transmitting infrared rays and in order to keep their temperatures lower than a definite temperature by air or (inert gas) flowing through said gas pipe 15 under pressure while smoke is eliminated by injecting said air (or inert gas) around the periphery of said lens 18 of said condenser 5.

Also, it is desired to measure temperatures of said objects to be machined W at the positions according to the kind of said objects W and the kind of machinings to be done. To this end, the detectors for measuring temperatures have been conventionally mounted around the outside periphery of said condenser 5. It is, however, necessary to use a member for supporting said detectors on said condenser 5, condensing lenses for said detectors and the like, in this case. Accordingly, in this example, said fibers 17 for transmitting infrared rays used for measuring temperatures are also included in said flexible cable 3. The lens 18 is used for both said fibers 16 for transmitting perpendicularly infrared rays used for machining and said fibers 17 for transmitting aslant infrared rays used for measuring temperatures. Infrared rays, irradiated to the machining positions on the surface of said objects W, are transferred through said fibers 17, and temperatures are measured by means of a detector 19 positioned at the end portion side of said flexible cable 3.

Referring now to FIGS. 4, 5, there are shown holder 20 for the fibers 16 and 17, a holder 21 for the lens 18, an air vent 22, an exhaust pipe 23, and an inlet of gas.

In addition, although only a $CO_2$ laser machining apparatus for printing was described in this example, it goes without saying that the present invention can be applied also for the apparatus for heat treatment, welding, cutting, drilling and the like. For example, in a $CO_2$ laser machining apparatus of the present invention, thermally expandable materials may be used as said objects W to be machined so that only the spots irradiated by laser beams may be expanded while an electric circuit for transforming letters into raised letters is incorporated in said control means 12. Thus, the present invention can be used as a braille-printer in which raised letters are printed on said objects W by putting the data of letters into said control means 12. Furthermore, said optical system is not restricted by the direction of bending because it is constructed from said fibers 16 for transmitting infrared rays and consequently it is possible to transfer said condenser 5 to machine said objects W three-dimensionally only by improving the construction of said driving means 7.

What is claimed is:

1. A $CO_2$ laser machining apparatus comprising:
    a $CO_2$ laser oscillator for irradiating $CO_2$ laser beams,
    a stand for placing an object to be machined thereon,
    a condenser having a lens means for condensing the $CO_2$ laser beams onto the object to be machined,
    a driving means for transferring said condenser two-dimensionally on said stand,
    a control means for controlling said $CO_2$ laser oscillator and said driving means,
    a flexible cable, connected with said $CO_2$ laser oscillator and said condenser, including a bundle of fibers for transmitting infrared rays perpendicularly through the lens means onto the object to be machined,
    at least one further bundle of fibers, optically adjusted to a position to be machined, for transmitting infrared rays aslant through the lens means onto the object to be machined, and
    a temperature sensor means for detecting the infrared rays transmitted by the one further bundle of fibers in order to measure temperatures at the position to be machined.

2. An apparatus as claimed in claim 1, further comprising:
    a power meter mounted on said stand for detecting the energy of the laser beams.

3. An apparatus as claimed in claim 1, further comprising:
    an inlet means, arranged at an end of the flexible cable opposite to said condenser for admitting cool gas around the flexible cable, and
    an exhaust pipe at the lens means facing said stand.

4. An apparatus as claimed in claim 2, further comprising:
    an inlet means, arranged at an end of the flexible cable opposite to said condenser for admitting cool gas around the flexible cable, and
    an exhaust pipe at the lens means facing said stand.

5. An apparatus as claimed in claim 1, wherein the fibers for transmitting infrared rays measure about 10.6 micrometers each.

6. An apparatus as claimed in claim 5, further comprising:
a shutter arranged in the $CO_2$ laser oscillator, and
a laser beam transmitter positioned between the shutter and the flexible cable.

7. An apparatus as claimed in claim 1, wherein:
said driving means includes a rail; a first means, arranged perpendicularly to the rail, for transferring linearly along the rail; and a second means, mounted on the first means, for transferring longitudinally along the first means, said second means carrying the condenser therealong.

8. An apparatus as claimed in claim 5, wherein:
said control means is a microcomputer.

9. An apparatus as claimed in claim 8, wherein:
said microcomputer includes a means for inputting data and a means for displaying data.

10. An apparatus as claimed in claim 9, wherein:
said inputting means is a keyboard.

11. An apparatus as claimed in claim 3, further comprising:
a gas pipe positioned between the inlet means and the exhaust pipe;
means, positioned in the gas pipe, for holding one end of each of the bundles of fibers; and
an air vent passing through the holding means.

* * * * *